Nov. 19, 1946.    C. MANKOUSKI    2,411,329
HOLDER FOR WELDING RODS
Filed June 19, 1944
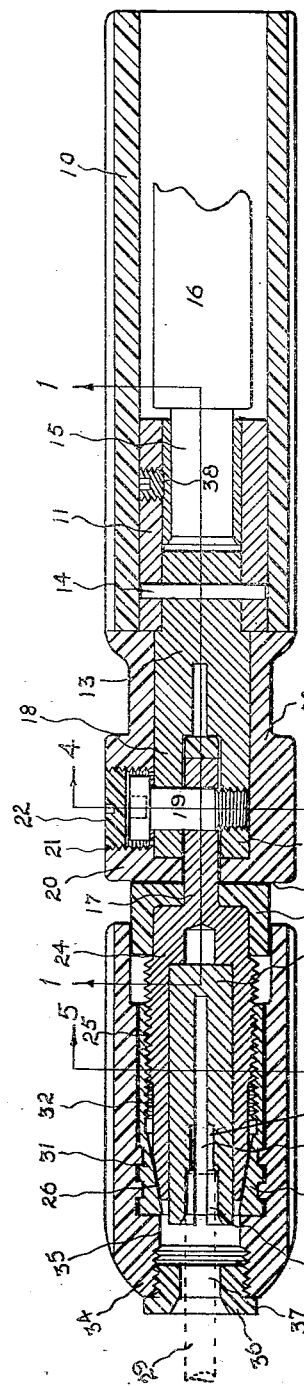
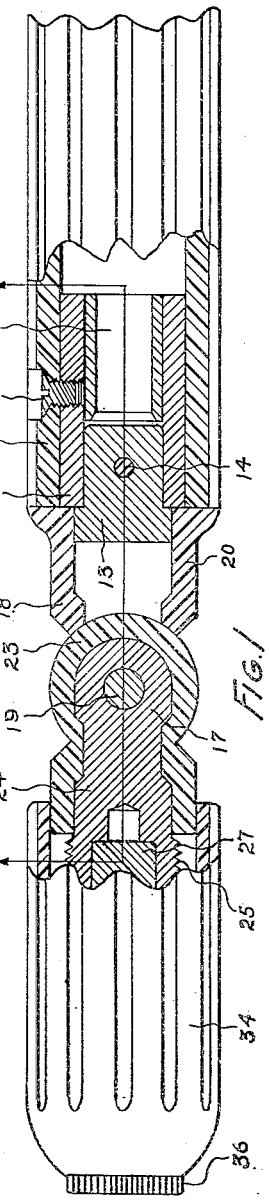
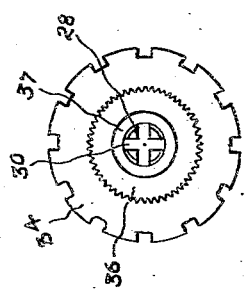
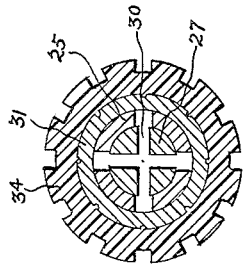
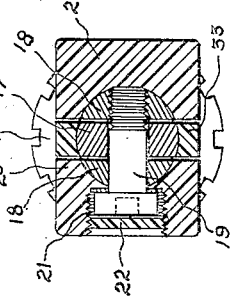
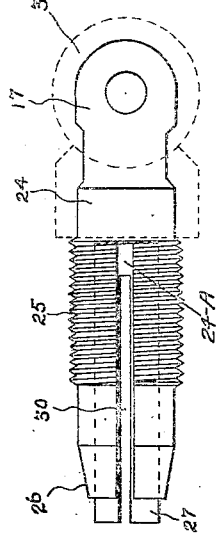
INVENTOR
CHARLES MANKOUSKI
BY C. Birkenbeul
ATTORNEY.

Patented Nov. 19, 1946

2,411,329

UNITED STATES PATENT OFFICE 2,411,329

HOLDER FOR WELDING RODS

Charles Mankouski, Portland, Oreg.

Application June 19, 1944, Serial No. 541,044

1 Claim. (Cl. 219—8)

This invention relates generally to electric welding and particularly to an improvement in welding rod holders.

The main object of this invention is to provide a completely insulated light weight welding rod holder capable of being turned in any direction to a position substantially 90 degrees on each side thereof.

The second object is to provide a holder of the class described which will handle a wide range of sizes by employing a plurality of stepped collets which will accommodate the entire range of rod diameters.

The third object is to provide a removable tip for the holder which is the only portion of the device subject to rapid deterioration due to excessive heat arising from burning rods held too closely.

The fourth object of the invention is to so construct the device as to eliminate the necessity of the use of steel upon steel and in which the expendable collets are extremely low in cost and easy to manufacture and insert.

I accomplish these and other objects in a manner set forth in the following specification as illustrated in the accompanying drawing, in which Fig. 1 is a fragmentary longitudinal section of the device taken along the line 1—1 in Fig. 3.

Fig. 2 is an end elevation of Fig. 1.

Fig. 3 is a longitudinal section taken along the line 3—3 in Fig. 1.

Fig. 4 is a transverse section taken along the line 4—4 in Fig. 3.

Fig. 5 is a transverse section taken along the line 5—5 in Fig. 3.

Fig. 6 is a side elevation of the threaded chuck member.

Similar numerals refer to similar parts throughout the several views.

Referring in detail to the drawing, there is shown a tubular handle 10 of insulating material and preferably fluted as illustrated to provide a better grip on the device. Within the handle 10 is provided a metallic bushing 11, which is secured within the handle 10 by means of a screw 12. Mounted in the bushing 11 is a metallic hinge portion 13 which is secured to the bushing 11 by means of a pin 14. Also insertable into the bushing 11 is the end 15 of an electric cable 16, through which current is supplied to the device.

A second hinge portion 17 is fitted between the sides 18 of the hinge portion 13 and is held thereto by means of the hinge pin 19. A molded head 20 covers the hinge portion 13. A threaded opening 21 is provided around the head of the screw 19 and is normally closed by means of the threaded plug 22. The closed end 23 of the head 20 is slotted to permit the swinging movement of the hinge portion 17.

The hinge portion 17 has formed thereon a chuck body 24, having intersecting slots 24—A and having the threaded central portion 25 which terminates in the tapering end 26. Within the chuck body 24 is disposed a bronze or suitable metal collet 27 having a double step opening 28 and one or more smaller openings 28—A for the reception of a welding rod 29. The collet 27 is provided with slots 30 to permit the contraction thereof when compressed by means of the chuck 24.

Upon the tapering end 26 of the chuck 24 is mounted the conical steel or bronze chuck closer 31 whose threaded portion 32 engages the threads of the chuck 24. The end of the chuck 24 nearest the end 23 of the member 20 is provided with a cap 33 of insulating material. The member 31 is enclosed within or moulded into the fluted handle grip 34 and retained in place by fluting, and having an opening 35 in its outer end, which is threaded to receive the insulating bushing 36, preferably of a type which will withstand a large amount of heat. The bushing 36 is provided with a central opening 37, through which the rod 29 can freely pass.

The operation of the device is as follows:

When it is desired to mount a rod 29 in the holder, it is only necessary to be sure that the proper collet 27 is in place and then to insert the rod 29 into the hole 37 and then turn the hand grip 34 in a direction to cause the conical member 31 to ride upon the tapering end 26 of the chuck 24. Now if it is desired to hold the rod in a position out of alignment with the handle 10, it is only necessary to move the handle grip end 34 by swinging it on the hinge pin 19, where it is held fractionally.

It will be noted that in this construction, all of the metallic or current conducting parts are thoroughly covered with insulating material and that the portion which holds the welding rod itself has a long line of contact and being made of bronze or suitable metal will not adhere thereto or to the surrounding chuck 24.

In order that the cable end 15 may be held within the bushing 11, there is provided a set screw 38 which, although touching the conductor, is itself covered by the handle 10. I am aware that numerous forms of welding rod holders have been constructed in the past, and an example of which is seen in my co-pending application, Serial Number 469,924, over which this device is an improvement. It is a well known fact that other inventors have attempted to make electrode holders in which the angularity of the rod with relation to the handle may be varied, but such devices have failed owing to the extreme difficulty of properly insulating the same.

While I have thus illustrated and described my invention, it is not my desire to be limited to the precise form shown herein, and I intend to cover such forms and modifications of the invention as fall fairly within the appended claim.

I claim:

In a device of the class described, a combination of a metallic hinged element having an electrical conductor attached to one end thereof and having a quill chuck mounted on the opposite end thereof, said quill chuck having a threaded exterior, a spring collet mounted within said chuck having a stepped rod receiving opening, a conical closer for said collet adapted to engage the end of said chuck, a hand grip attached to said chuck closer, a cap for the hinged end of said chuck telescopically disposed with relation to said hand grip, and insulating means whereby the entire metallic portions of the device are shielded.

CHARLES MANKOUSKI.